United States Patent [19]

Jones et al.

[11] Patent Number: 5,388,637
[45] Date of Patent: Feb. 14, 1995

[54] ACTIVATED CARBON ABSORBENT WITH INTEGRAL HEAT TRANSFER DEVICE

[75] Inventors: Jack A. Jones, Los Angeles; Andre H. Yavrouian, Glendale, both of Calif.

[73] Assignee: California Institute of Technology, Pasadena, Calif.

[21] Appl. No.: 955,465

[22] Filed: Oct. 2, 1992

[51] Int. Cl.$^6$ .......................... B01J 20/26; B01J 20/32
[52] U.S. Cl. ................................. 165/104.12; 165/133; 62/480; 55/269; 502/402
[58] Field of Search ............................ 165/104.12, 133; 62/480, 46.2; 55/269; 502/402

[56] References Cited

U.S. PATENT DOCUMENTS

| | | | |
|---|---|---|---|
| 4,709,558 | 12/1987 | Matsushita et al. | 62/480 |
| 4,819,717 | 4/1989 | Ishikawa et al. | 62/46.2 |
| 4,999,330 | 3/1991 | Bose et al. | 502/402 |
| 5,042,259 | 8/1991 | Jones | 62/46.2 |
| 5,043,310 | 8/1991 | Takeuchi et al. | 502/404 |
| 5,046,319 | 9/1991 | Jones | 62/46.2 |

*Primary Examiner*—Albert W. Davis, Jr.
*Attorney, Agent, or Firm*—F. Eugene Logan

[57] ABSTRACT

An integral adsorbent-heat exchanger apparatus for use in ammonia refrigerant heat pump systems. The apparatus has a finned tube heat exchange member. A bonded, pyrolyzed activated carbon adsorbent matrix, formed from a mixture of activated carbon particles and resol bonder, is tightly adjoined to the fins and the tube to form an integral apparatus. The integral apparatus is capable of withstanding repetitive adsorption and desorption cycles without the matrix becoming unbonded and without the matrix becoming unadjoined from the fins and tube. The apparatus permits very high rates of adsorption and desorption of refrigerant and very high rates of heat transfer between the refrigerant and the heat transfer fluid.

29 Claims, 5 Drawing Sheets

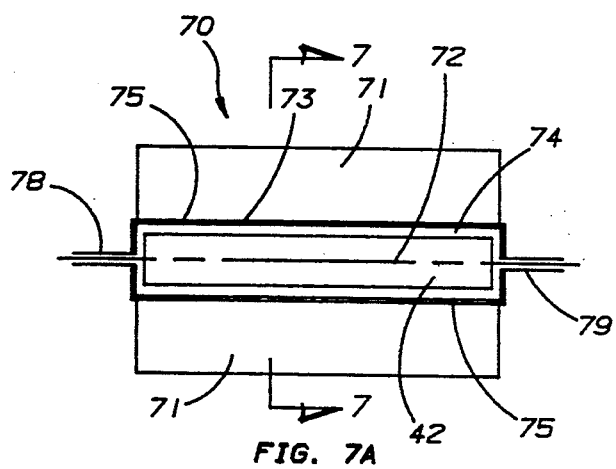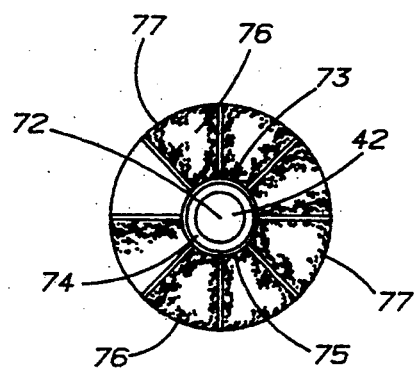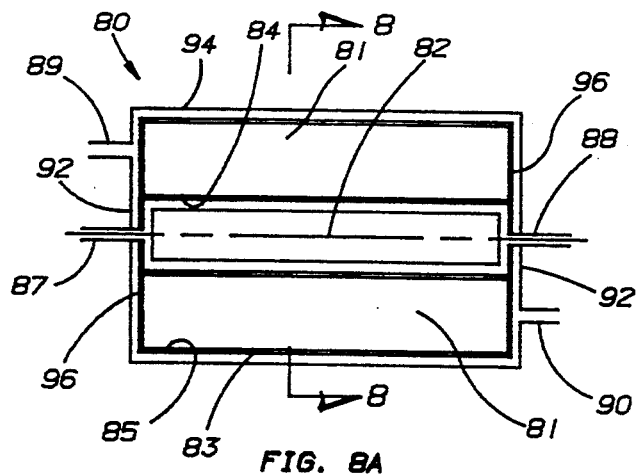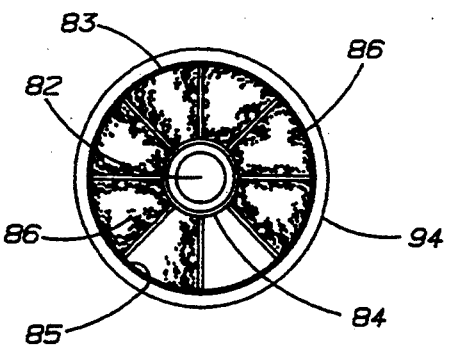
FIG. 7A  FIG. 7B
FIG. 8A  FIG. 8B

ACTIVATED CARBON ABSORBENT WITH INTEGRAL HEAT TRANSFER DEVICE

ORIGIN OF INVENTION

The invention described herein was made in the performance of work under a NASA contract, and is subject to the provisions of Public Law 96-517 (35 USC in which the Contractor has elected to retain title.

BACKGROUND OF THE INVENTION

1. Technical Field

The field of this invention is heat pump systems and heat transfer elements useful in such systems. The heat transfer elements of this invention are finned tube heat exchanger member having as an integral part thereof an activated carbon adsorbent.

2. Discussion of the Invention

Heat pump systems have the advantage over conventional air conditioning systems in that they can function as heating units in the winter months.

To maximize the efficiency of heat pump systems, for example such systems as those described in U.S. Pat. Nos. 5,042,259 and 5,046,319, it is desirable to improve the heat transfer rate between the fluids, for example between the refrigerant or working fluid and the heat transfer fluid. Various heat exchanger designs are commercially available for transfer of heat between fluids. U.S. Pat. No. 4,709,558 discloses a finned tube heat exchanger member having an adsorbent in the space between fins.

U.S. Pat. No. 4,999,330 discloses a process for forming high density activated carbon in cast or molded forms using PVA or methylcellulose as a binder. Methods of making moldable forms of activated carbon are disclosed in U.S. Pat. No. 5,043,310.

SUMMARY OF THE INVENTION

It is an object of this invention to provide an adsorbent-containing heat exchanger element for the very rapid adsorption and desorption of ammonia as refrigerant or working fluid, and for the very rapid transfer of heat between the ammonia and heat transfer fluid. To prevent deterioration of the refrigerant and the adsorbent, the ammonia must not react with the adsorbent or the metal parts of the heat exchanger. For the system to be efficient the adsorbent must also be adjoined to the surface of the metal parts of the heat exchanger in good thermal contact therewith, and most importantly, in such a way that the adsorbent does not, as a consequence of high frequency of heat and adsorption-desorption cycling (i.) become loose and forfeit good thermal contact, or (ii.) powder, flake off or breakup and fall off the metal parts of the heat exchanger.

Because of their relatively low surface area, materials such as silica gels, zeolites and alumina are not good choices as adsorbent. It is known, however, that pure activated carbon does not react with ammonia and has relatively high surface area. Unfortunately pure activated carbon particles can not be used because they would fall away from the metal parts of the heat exchanger and not provide the necessary good thermal contact desired. Various binders have been used to mold activated carbon particles into various shapes. Unfortunately many of the binders, while providing good binding characteristics, will react with ammonia and therefore can not be used in systems using ammonia as the refrigerant or working fluid. It will also be appreciated that mechanical means, such as very fine mesh screens, or small orifice inlet and outlet to otherwise sealed adsorbent chambers, can seriously retard the rate of adsorption and desorption of refrigerant or working fluid and can result in low relative thermal conductivity of sorbent. Therefore for the adsorbent-heat exchanger device to be most useful, the means for retaining the adsorbent in the device should not retard the rates of refrigerant adsorption and desorption or the rates of heat transfer.

Therefore, it is important in heat pump systems that the adsorbent-heat transfer element can rapidly adsorb and desorb refrigerant and rapidly transfer heat between the refrigerant and the heat transfer fluid. Commercial value can be likened to a pie eating contest in which the one who can eat the most, the fastest, wins. In the case of heat pump systems, the system that sorb and desorb refrigerant the fastest and transfer heat from the refrigerant to the heat transfer fluid the fastest, other factors being held constant, will have a commercial advantage over other systems. Each cycle of the sorption-desorption is like one bite of the pie. Rather, however, instead of one bite of pie, there is one gulp of a quantity of heat. Unlike the pie eating champion, however, the commercially successful heat transfer device does not have the luxury of a time to recover but must instead continue to adsorb and desorb refrigerant and to transfer heat indefinitely.

The problem in heat pump systems is to provide adsorbent-heat transfer elements which will rapidly adsorb and desorb refrigerant and yet be inexpensive so that the system can compete with conventional freon based air conditioners.

In systems using ammonia, the adsorbent, and the structural materials of the heat transfer units which are exposed to ammonia, must not react with the ammonia. A chemically acceptable adsorbent is pure activated carbon. Acceptable structural materials are aluminum and stainless steel. Since ammonia will react with copper, this metal can not be used with ammonia based refrigerant systems if the ammonia will have direct contact with the copper.

Therefore, it is also an object of this invention to provide a finned tube heat exchanger member having an activated carbon adsorbent adjoined to the fin and outside surface of the tube surface which can effect and withstand rapid adsorption and desorption of refrigerant and rapid and large swings in temperature without deteriorating and loosing good thermal contact between the adsorbent and the metal parts of the heat exchanger device. Another object of this invention is to provide a heat transfer element having a long life cycle to eliminate, or minimize, replacement of the element over the life of the heat pump system. Yet another object of this invention is to provide an inexpensive heat transfer element for use in heat pump systems.

In this invention excellent thermal contact between activated carbon particles and between the activated carbon particles and the metal parts of the heat exchanger device are achieved thereby enabling very high rates of refrigerant adsorption and desorption and heat transfer to be achieved.

Accordingly there is provided by the principles of this invention an integral apparatus for the transfer of heat having a tube part and a fin part, the fin part being in direct contact with the tube part and outwardly thereof, the fin part forming a plurality of spaced apart fins and spaces along the tube part between the fins; and an activated carbon adsorbent in the spaces, adjoined to the fins and the tube part to form an integral apparatus.

In one embodiment the fin part is aluminum. In another embodiment the tube part is aluminum. In still another embodiment the tube part is stainless steel. In a further embodiment the fin part of the finned tube heat exchanger member is aluminum and comprises an annular member, which surrounds the tube part, and to which the fins are attached. In a preferred embodiment the fins extend in a direction perpendicular to the axis of the tube part. The activated carbon part of the integral apparatus is made from activated carbon particles, activated carbon granules, pre-shaped activated carbon forms, or combinations of such forms of activated carbon. In another embodiment the activated carbon adsorbent comprises pre-shaped activated carbon forms made from activated carbon particles.

In one embodiment the activated carbon adsorbent in the spaces between the fins is adjoined to the fins and the tube part by a process which comprises placing activated carbon and an adjoining agent into the spaces, and thereafter, subjecting the apparatus with the mixture in the spaces to an elevated temperature operable for causing the adjoining agent to adjoin the activated carbon to the fins and to the tube part. In one embodiment the elevated temperature is between about 400° C. and about 600° C. In another embodiment the elevated temperature is at least about 400° C. but below the temperature at which the metal of the fin weakens. In still another embodiment the elevated temperature is effected by heating the apparatus at a rate of about 100° C./hr under a non-deleterious atmosphere until a peak temperature of about 600° C. is reached, and thereafter, maintaining the apparatus at the peak temperature for about 10 to about 20 hrs.

In still another embodiment the process of adjoining the activated carbon to the fins and the tube part, i.e. the metal parts, comprises placing a mixture which comprises a binder having a carbon based molecular structure, and particles of activated carbon, into the spaces, and thereafter, subjecting the apparatus with the mixture in the spaces to an elevated temperature operable for pyrolyzing the binder, and for adjoining the activated carbon particles to each other and to the metal parts. In one embodiment the binder is resol. In another embodiment the placing of the mixture into the spaces comprises pressing the mixture under an elevated pressure of at least about 690 kPa (100 psi). In a preferred embodiment the pressing pressure is at least about 3450 kPa (500 psi) and in an especially preferred embodiment the pressing pressure is at least about 6900 kPa (1000 psi).

In still another embodiment the process of adjoining the activated carbon to the metal parts comprises pressing a mixture which comprises a binder having a carbon based molecular structure, a solvent for the binder, and particles of activated carbon, into the spaces, thereafter, removing an effective amount of the solvent from the mixture operable for allowing the mixture to be pyrolyzed to a density of at least about 0.3 g/cc while remaining in the spaces, and thereafter, pyrolyzing the binder to adjoin the activated carbon particles to each other and to the metal parts. In one embodiment the solvent is selected from the group consisting of alcohols, ketones and mixtures thereof. In another embodiment the solvent is isopropanol.

In yet another embodiment the process of adjoining the activated carbon to the metal parts comprises forming a first mixture which comprises a binder having a carbon based molecular structure and a solvent for the binder, forming a second mixture which comprises a solvent and particles of activated carbon, and adding an effective amount of the first mixture to the second mixture operable for causing the first mixture to wet the activated carbon particles of the second mixture thereby forming a third mixture. Thereafter, removing an effective amount of solvent from the third mixture operable for producing a mixture of lower solvent content which can be pressed into the spaces without exuding a large amount of solvent. This prevents loss of binder in the mixture prior to pyrolysis. Next, the mixture of lower solvent content is pressed into the spaces. Thereafter, with the mixture pressed into the spaces, removing an effective amount of solvent from the mixture operable for allowing the mixture to be pyrolyzed to a density of at least about 0.3 g/cc while remaining in the spaces, and then, pyrolyzing the binder to adjoin the activated carbon particles to each other and to the metal parts.

In a further embodiment the process for adjoining the adsorbent to the metal parts further comprises, after adding the first mixture to the second mixture and before removing solvent from the mixture, adding an effective amount of a solvent to the third mixture to adjust the viscosity of the mixture to between about 10,000 and about 500,000 poise. This additional step improves the distribution of the binder over the activated carbon particles.

In one embodiment the process for adjoining the adsorbent to the metal parts further comprises adjusting the weight ratio of solvent-to-binder in the first mixture to a value between about 0.5 and about 5. In another embodiment the adjoining process further comprises adjusting the weight ratio of solvent-to-activated carbon in the second mixture to a value between about 0.1 and about 5. In still another embodiment the adjoining process comprises adjusting the weight ratio of binder-to-activated carbon in the third mixture to a value between about 0.05 and about 0.5.

In yet a further embodiment the process for adjoining the adsorbent to the metal parts further comprises adjusting the weight ratio of solvent-to-activated carbon in the third mixture to a value between about 0.5 and about 6, and the weight ratio of solvent-to-binder therein to a value between about 6 and about 10.

In a preferred embodiment the process for adjoining the adsorbent to the metal parts further comprises adjusting the solvent-to-binder weight ratio in the first mixture to a value between about 1.8 and about 2.4, adjusting the solvent-to-carbon weight ratio in the second mixture to a value between about 0.7 and about 1.3, and adjusting the binder-to-carbon weight ratio in the third mixture to a value between about 0.2 and about 0.3. Thereafter, adding an effective amount of a solvent to the third mixture to adjust the solvent-to-carbon weight ratio to a value greater than about 1.9 but less than about 2.3 and mixing to improve the distribution of binder on the activated carbon particles, and then, reducing the solvent-to-carbon weight ratio to a value between about 1.7 but less than about 2.

In an especially preferred embodiment the process for adjoining the adsorbent to the metal parts further comprises adjusting the solvent-to-binder weight ratio in the first mixture to a value between about 2 and about 2.2, adjusting the solvent-to-carbon weight ratio in the second mixture to a value between about 0.9 and about 1.1, and adjusting the binder-to-carbon weight ratio in the third mixture to a value between about 0.22 and about 0.28. Thereafter, adding an effective amount of a solvent to the third mixture to adjust the solvent-to-carbon weight ratio to a value greater than about 2 but no greater than about 2.2 and mixing to improve the distribution of binder on the activated carbon particles, and then, reducing the solvent-to-carbon weight ratio to a value less than about 1.95.

In a further embodiment the process for adjoining the adsorbent to the metal parts further comprises painting a solvent containing dissolved resol on the outside surface of the pyrolyzed adsorbent, and thereafter, subjecting the apparatus to an elevated temperature operable for pyrolyzing the resol on the outside surface.

BRIEF DESCRIPTION OF THE DRAWINGS

FIG. 7A is a cross-sectional view which illustrate another embodiment of this invention in which the fin part extends outwardly from the central tube part, and also extends in a direction which is both perpendicular to, and longitudinal to, the axis of the tube part.

FIG. 7B is a cross-sectional view through line 7—7 of FIG. 7A which illustrates that the fins extend outwardly in spoke-like fashion from the central tube part.

FIG. 8A is a cross-sectional view which illustrate yet another embodiment of this invention in which the fin part extends inwardly from the tube part, and also extend in a direction which is both perpendicular to, and longitudinal to, the axis of the tube part.

FIG. 8B is a cross-sectional view through line 8—8 of FIG. 8A which illustrates that the fins extend inwardly from the tube part.

DESCRIPTION OF THE PREFERRED EMBODIMENTS

Figure 1:
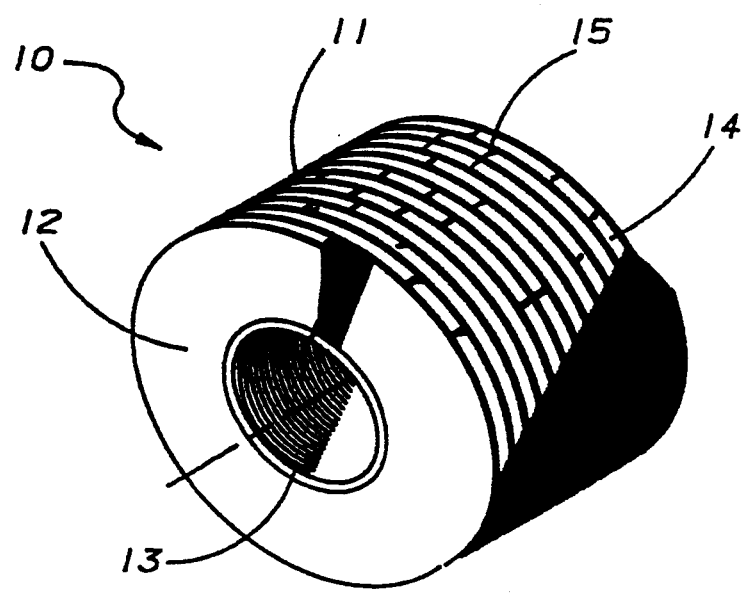
FIG. 1 is a perspective view of a section of an integral adsorbent-heat exchanger device of this invention.

This invention combines a resol binder with activated carbon using isopropanol to dissolve the thick resol and enable adequate mixing. The isopropanol is then partially evaporated, and the resulting thick tar-like mixture, is then pressed and molded into an inexpensive finned aluminum tube extrusion. The extrusion with the in-place activated carbon is then dried and pyrolyzed in a nitrogen atmosphere at about 600° C. for at least 24 hours to form an integral adsorbent-heat exchanger device 10 as illustrated in FIG. 1.

The remaining isopropanol is therefore fully evaporated and the resol decomposed, leaving behind a carbon skeleton that holds the activated carbon particles together and in intimate contact with, and adjoined to, the aluminum, thereby forming an integral apparatus that enables achievement of very high rates of heat transfer between the carbon and the aluminum.

The center of the aluminum extrusion is hollow, thus allowing for a heat transfer fluid, such as water or Dowtherm TM heat transfer fluid, to rapidly heat or cool the aluminum extrusion and integral activated carbon body adjoined thereto.

A process for adjoining the activated carbon to the aluminum extrusion is follows. Approximately 90 grams (90 g) of Anderson AX-21 dry activated carbon was mixed with 90 g of isopropanol which resulted in a mixture similar in viscosity to moist sand. Separately, approximately 11 g of resol were mixed with 57 g of isopropanol, resulting in a very flowable resol-containing liquid. The resol solution was then mixed with the wetted activated carbon and stirred. Approximately 68 g more of isopropanol was added to the mixture and stirred which resulted in a mixture having the consistency of a loose, tar-like mixture which could be well mixed.

The isopropanol in the mixture was allowed to evaporate resulting in a weight loss of about 17 g and producing a mixture having a consistency like that of thick tar to allow subsequent pressing without a large loss of dissolved binder in the solvent.

This mixture was then pressed into spaces between fins 11 of aluminum extrusion 12 as illustrated in FIG. 1. The fin diameter was 2.65 inches (2.65"), and internal tube 13 was 1.65" long and 1.25" in diameter. There were approximately 9.5 fins per inch having an average fin thickness of about 0.018". A pressure of about 1000 psi over a period of about 5 minutes, was applied to the activated carbon-filled fins.

The excess activated carbon from outside of the finned area was removed, and unit was allowed to air dry for several days at about 40° C. to enable achievement of good ultimate adsorbent matrix density. The assembly was then heated to 600° C. with a dry nitrogen purge. The heating rate was approximately 100° C. per hour until 600° C. was reached. Thereafter, a temperature of 600° C. was maintained for about 18 hours. The resulting unit, as shown in FIG. 1, was a bonded activated carbon matrix 14 that was adhered to the aluminum fins and outside of the tube body thereby forming an integral adsorbent-heat exchanger device 10.

Some unanticipated longitudinal circumferential cracks 15 occurred in the activated carbon matrix which extended from the outside diameter of the matrix to the tube as illustrated in FIG. 1. The cracking did not interfere with the adhesion of the adsorbent matrix to the metal parts or the integrality of the adsorbent-heat exchanger device. It was noticed, however, that the cracks improved the gas flow into and out of the activated carbon matrix thereby improving the rates of refrigerant adsorption and desorption. Therefore the particular activated carbon mixture, the mixing, pressing and drying procedures prior to pyrolysis, and the temperature-time cycle of the pyrolysis, produced an improved matrix for gas diffusion without effecting integrality of the adsorbent-heat exchanger device.

Figure 2:
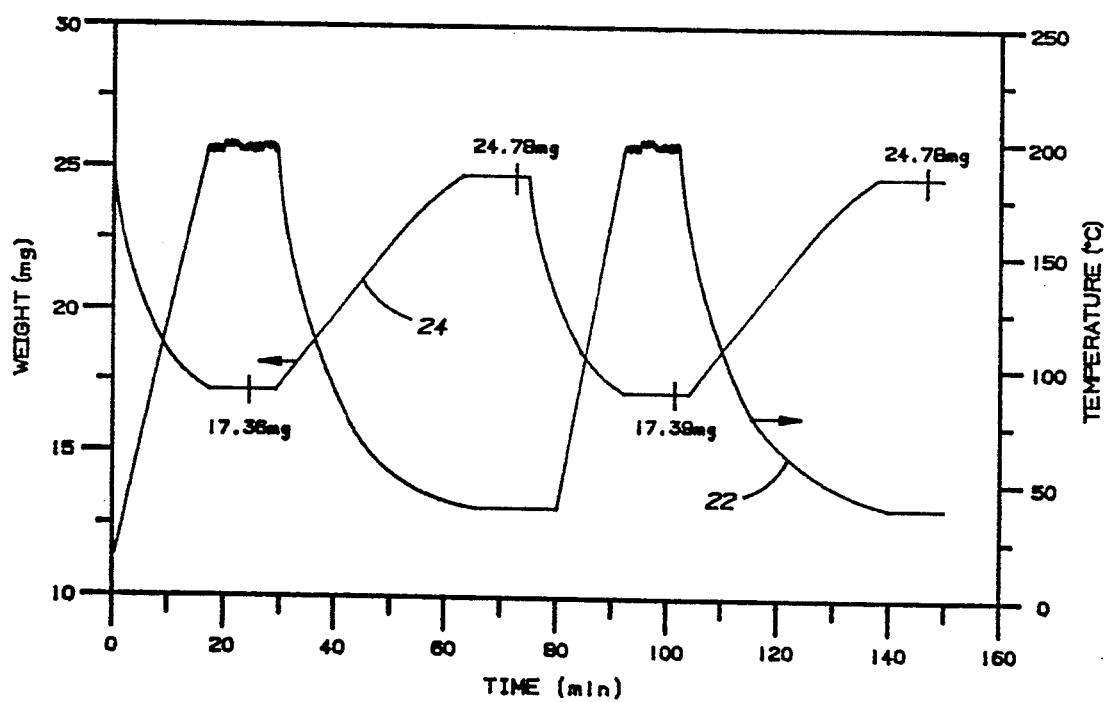
FIG. 2, is a graph of Thermal-Gravimetric-Analyzer test using Refrigerant 22 ("R22") as the sotbate.
Figure 3:
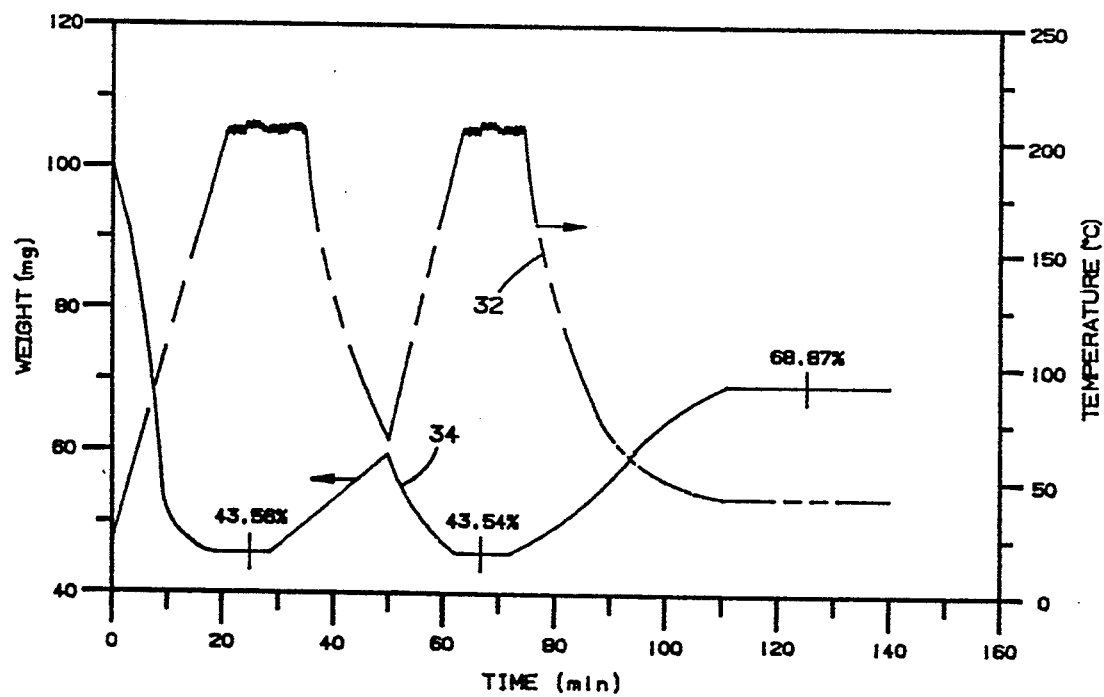
FIG. 3 is a graph of Thermal-Gravimetric-Analyzer test using R22 onto Anderson AX-21 activated carbon without a binder.

The density of the activated carbon matrix was measured and determined to be 0.36 g/cc. A density of at least about 0.3 g/cc is most useful in ammonia-heat pump systems. The BET area of the activated carbon matrix was about 2200 $m^2/g$ as estimated by a Thermal-Gravimetric-Analyzer test using Refrigerant 22 ("R22") as the sotbate, see FIG. 2, and comparing the adsorption with R22 onto Anderson AX-21 activated carbon without a binder, see FIG. 3. The known BET surface area of Anderson AX-21 is approximately 3000 $m^2/g$. Curves 22 and 32 represent temperature. Curves 24 and 34 represent combined weight of adsorbent and refrigerant with the change in weight representing sorption or desorption of refrigerant.

The dissolving agent can be isopropanol or other alcohols, or any solvent for the binder employed. The pressing pressure for molding the activated carbon mixture into the fin area of the unit can be increased to increase the ultimate adsorbent density. The amount of resol binder can be between 3% and 60% by weight of the dry activated carbon weight. The resol used for these tests was from a standard supply source of A-stage phenol-formaldehyde resins. The resin is fusible, becoming a liquid on heating, and upon further heating is transformed into an infusible, insoluble thermoset cross-linked polymer substance.

Figure 4:
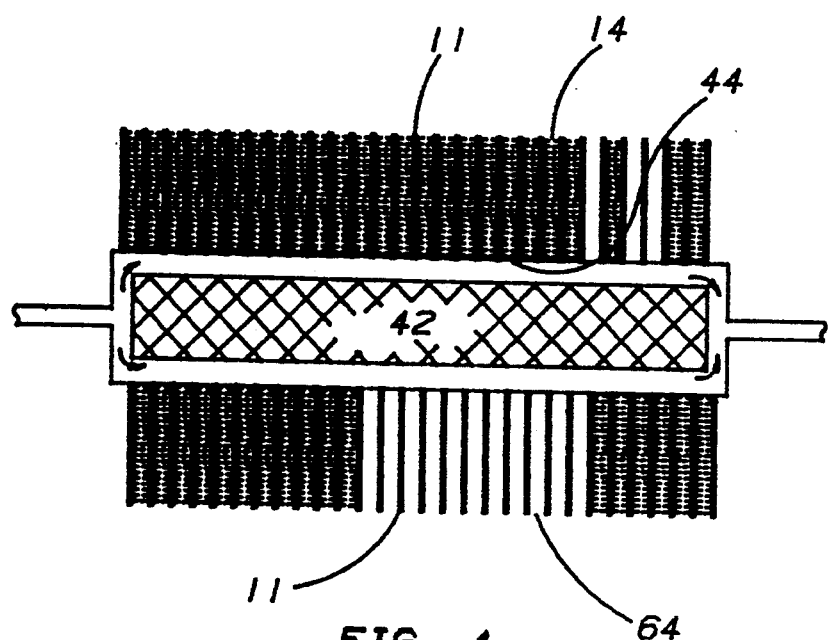
FIG. 4 is a cross-sectional view of the complete apparatus of FIG. 1.

The heat transfer coefficient can be increased by placing an ullage element 42, see FIG. 4, inside tube 44 to further constrict the heat transfer fluid to the inside diameter of the tube.

In mobile systems or other systems subject to vibration, added integrity can be achieved by painting a resol solution onto the outside surface of the activated carbon matrix and then re-pyrolyzing the unit. A circumferential screen can also be added to the outside matrix surface for support. The mesh of the screen should be large enough to not interfere with refrigerant adsorption and desorption rates to and from the adsorbent.

Figure 5:
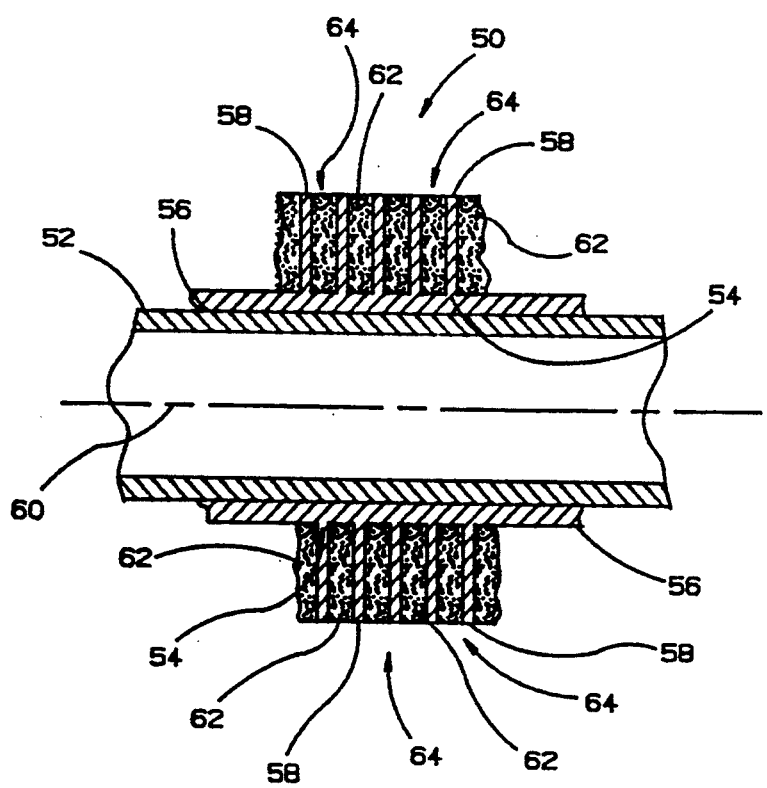
FIG. 5 is a cross-sectional view of a section of a spiral aluminum finned extrusion on an inner tube similar to FIG. 1.

FIG. 5 represents a typical center section 50 of one embodiment of this invention having a stainless steel center tube 52 for strength and an aluminum extrusion fin part 54 having annular member 56 and spiral wound fin 58. Spiral wound fin 58 is like the thread of a screw and is one fin spirally disposed around tube 52. However, when viewed in cross section, spiral wound fin 58 forms a plurality of spaced apart fins, and is therefore usually referred to in the plural, i.e. as fins 58.

Fins 58 are extruded simultaneously with the annular member 58 and directly onto stainless steel center tube 52. Fins 58 extend outwardly from, and are perpendicular to, axis 60 of stainless steel tube 52. An activated carbon matrix 62 is securely bound in spaces 84 between fins 58 thereby forming an integral adsorbent-heat exchanger device.

The outside diameter of the fins and activated carbon matrix is between about 1.5" and about 8", the fin thickness between about 0.005" and about 0.05", and the wall thickness of annular member 56 between about 0.01" and about 0.1". The distance between opposing fins is between about 0.05" and about 0.5". The stainless steel inner tube 52 has an outside diameter of between about 1" and about 7", and a wall thickness of between about 0.02" and about 0.2". Metal parts 52 and 54 can be made easily and inexpensively.

Figure 6:
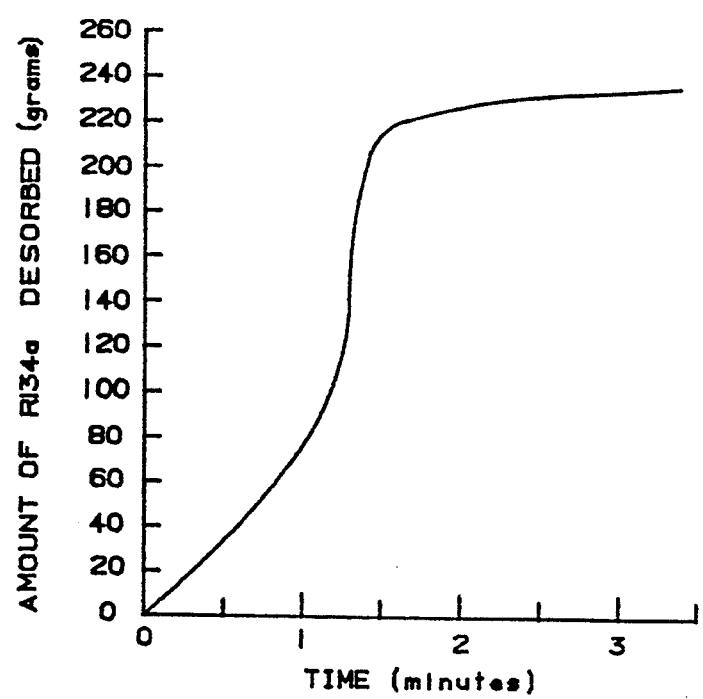
FIG. 6 is graph of test data demonstrating the improved heat transfer rate achievable with the adsorbent-heat exchanger device of this invention.

FIG. 6 is a plot of actual test data of an adsorbent-heat exchanger device of this invention in which the activated carbon particles were adjoined to each other and to the metal parts of the finned tube heat exchanger. The adsorbent-heat exchanger device of this invention was similar to that shown in FIG. 4 and had a length of 23". The heat transfer fluid was pressurized water at about 180° C. and operated at a flow rate of 0.1 gallons per minute. The sorbate was R134a which was desorbed at about 140 psia. The device achieved a nearly fully desorbed heated condition in only about 2 minutes.

This can be compared to the data presented in FIGS. 5 and 7 of U.S. Pat. No. 4,709,558 in which a finned tube heat exchanger containing an adsorbent, believed to be granular solid silica gel held in place by wipe nets 20 and 20' (see column 8, line 37) rather than adjoining of the granular adsorbent particles to each other and to the metal parts of the heat exchanger, appears to not even be close to steady state, i.e. a nearly full heated condition, after 3.5 minutes. U.S. Pat. No. 4,709,558 is hereby incorporated herein by reference.

FURTHER EXAMPLES

The following examples illustrate the successes and failures experienced in tests which lead to the production of the improved adsorbent-heat exchanger device of this invention.

Example No. 1—Omission of Solvent

The binder was mixed directly with the activated carbon particles in an attempt to coat the particles with binder. In particular 2 g of resol was mixed with 10 g of activated carbon particles. It was observed that the resol stuck together as a thick blob and could not be distributed throughout the particles.

Example No. 2—Inadequate Distribution of Binder

A first mixture was prepared by mixing 6.3 g of isopropanol (hereinafter referred to as "iso") as a solvent, with 300 g of resol as a binder, thereby forming a solvent-to-binder ratio of 0.021. A second mixture was prepared by mixing 12 g of iso with 12 g of dry activated carbon particles, thereby forming a solvent-to-carbon ratio of 1. The second mixture was added to, and vigorously mixed with, the first mixture, thereby forming a solvent-to-carbon ratio of 1.53 and a binder-to-carbon ratio of 25. Mixing was very difficult and even after 30 minutes vigorous mixing the resol was more concentrated in some places than in other places. It therefore was concluded that an adequately bound activated carbon product would not be formed from this mixture upon pyrolysis.

Example No. 3—Pre-Saturation of Carbon with Solvent

A first mixture was prepared by mixing 40 g of iso, as a solvent, with 16 g of resol as a binder thereby forming a solvent-to-binder ratio of 2.5. A second mixture was prepared by mixing 200 g of iso with 150 g of dry activated carbon particles, thereby forming a mixture having the consistency of moist sand or nearly saturated carbon, with a solvent-to-carbon ratio of 1.33. The second mixture was added to, and vigorously mixed with, the first mixture, thereby forming a third mixture having a solvent-to-carbon ratio of 1.6 and a binder-to-carbon ratio of 0.107. Thereafter 55 g of iso was added to, and vigorously mixed with the third mixture thereby increasing the solvent-to-carbon ratio to 1.97. About 20 g of iso was evaporated from the mixture to form a very thick tar thereby decreasing the solvent-to-carbon ratio to about 1.83. This mixture was pressed under 1000 psi into the spaces between consecutive spaced apart fins, then dried over night, and then pyrolyzed using the following temperature-time heating sequence.

The finned tube heat exchanger member with the mixture filling the spaces between consecutive spaced apart fins was heated at a rate of 100° C./hr to a temperature of 600° C. under a dry $N_2$ purge. It was then maintained at 600° C. for 18 hrs under the dry $N_2$ purge thereby pyrolyzing the resol. The unit was then cool to room temperature.

Upon inspection of the unit the pyrolyzed product was found to be very flaky and, therefore, was deemed to be unacceptable.

Example No. 4—Pro-Saturation of Carbon with Water

A first mixture was prepared by mixing 0.5 g of iso, as a solvent, with 0.75 g of resol as a binder thereby forming a solvent-to-binder ratio of 0.687. A second mixture was prepared by mixing 4.5 g of water with 3 g of dry activated carbon particles. The second mixture was added to, and vigorously mixed with, the first mixture, thereby forming a third mixture having a solvent-to-carbon ratio of 0.167 and a binder-to-carbon ratio of 0.25. Thereafter 6 g of iso was added to, and vigorously mixed with, the third mixture thereby increasing the solvent-to-carbon ratio to 2.17. It was noticed that the binder did not adhere the activated carbon particles together. This mixture was pressed under 1000 psi, then dried over night, and then pyrolyzed using the temperature-time heating sequence set forth in Example No. 3 above. The pyrolyzed product was very flaky and therefore was deemed to be unacceptable.

Example No. 5—Insufficient Binder

A first mixture was prepared by mixing 6 g of iso, as a solvent, with 0.6 g of resol as a binder thereby forming a solvent-to-binder ratio of 10. A second mixture was prepared by mixing 12 g of iso with 12 g of dry activated carbon particles thereby forming a solvent-to-carbon ratio to 1. The second mixture was added to, and vigorously mixed with, the first mixture, thereby forming a third mixture having a solvent-to-carbon ratio of 1.5 and a binder-to-carbon ratio of 0.05. Thereafter 6 g of iso was added to, and vigorously mixed with, the third mixture thereby increasing the solvent-to-carbon ratio to 2 and forming a mixture having the consistency of loose tar. About 2 g of iso was evaporated from the mixture thereby decreasing the solvent-to-carbon ratio to about 1.8 and forming a mixture having the consistency of thick tar. This mixture was pressed under 1000 psi, then dried over night, and then pyrolyzed using the temperature-time heating sequence set forth in Example No. 3 above. The pyrolyzed product was very flaky and therefore was deemed to be unacceptable.

Example No. 6—Pressing as a Loose Tar

A first mixture was prepared by mixing 63 g of iso, as a solvent, with 30 g of resol as a binder thereby forming a solvent-to-binder ratio of 2.1. A second mixture was prepared by mixing 120 g of iso with 120 g of dry activated carbon particles thereby forming a solvent-to-carbon ratio to 1. The second mixture was added to, and vigorously mixed with, the first mixture, thereby forming a third mixture having a solvent-to-carbon ratio of 1.53 and a binder-to-carbon ratio of 0.25. Thereafter 60 g of iso was added to, and vigorously mixed with, the third mixture thereby increasing the solvent-to-carbon ratio to 2.03 and forming a mixture having the consistency of loose tar. Solvent was not evaporated from the mixture to form a thick tar. Rather the loose tar mixture was pressed under 1000 psi into the spaces between consecutive spaced apart fins. A large amount of solvent and binder was wrung out of the mixture during the pressing operation. The pressed mixture was then dried over night, and then pyrolyzed using the temperature-time heating sequence set forth in Example No. 3 above. The pyrolyzed product was more flaky-than a corresponding sample (see Example No. 15 below) that was dried to a thick tar consistency prior to pressing and therefore was deemed to be less acceptable.

Example No. 7—Vibrating Mixture into Space between Fins

A first mixture was prepared by mixing 633 g of iso, as a solvent, with 300 g of resol as a binder thereby forming a solvent-to-binder ratio of 2.11. A second mixture was prepared by mixing 1200 g of iso with 1200 g of dry activated carbon particles thereby forming a solvent-to-carbon ratio to 1. The second mixture was added to, and vigorously mixed with, the first mixture, thereby forming a third mixture having a solvent-to-carbon ratio of 1.53 and a binder-to-carbon ratio of 0.25. Thereafter 600 g of iso was added to, and vigorously mixed with, the third mixture thereby increasing the solvent-to-carbon ratio to 2.02 and forming a mixture having the consistency of loose tar. About 150 g of iso was evaporated from the mixture to form a mixture having the consistency of thick tar. This mixture was placed on top of the finned tube heat exchanger member and the heat exchanger member vibrated to flow the mixture into the spaces between fins. Plastic sheeting was used to seal the bottom portion of the unit and retain the mixture between the fins. The unit was then dried over night, and then pyrolyzed using the temperature-time heating sequence set forth in Example No. 3 above. The pyrolyzed product was flaky and therefore was deemed to be unacceptable.

Example No. 8—Pyrolysis at temperatures other than 600° C.

Pyrolysis at temperatures significantly higher than 600° C. will result in weakening or melting of the aluminum fins and result in an unit having a low heat transfer value and of no commercial value. While pyrolysis at temperatures significantly lower than 600° C. will result in an incompletely pyrolyzed binder having a weakened structure, an unit in which ammonia refrigerant will react thereby contaminating the refrigerant, and hence result in an unit of no commercial value.

Example No. 9—Polyvinylidene Chloride as a Binder

Polyvinylidene chloride, available as a powdered solid, when used as a binder and mixed with activated carbon can not be sufficiently blended with the activated carbon so that when the mixture is pyrolyzed it will produce a bonded adsorbent. Polyvinylidene chloride requires a month long pyrolysis thereby raising the cost of the unit to exorbitant levels. Incompletely pyrolyzed polyvinylidene chloride generates hydrochloric acid vapors which corrode the unit and other parts of the system in which it is used.

Example No. 10—Carboxy Methylcellulose as a Binder

Carboxy methylcellulose or "Methocel" as a Binder will react with ammonia unless pyrolyzed, and if pyrolyzed it does not have any binding strength. In either case, the unit will have no commercial value.

Example No. 11—Kaopolite Clay as a Binder

Kaopolite clay when used as a binder requires pyrolysis at a temperature of about 1000° C. which exceeds the melting temperature of the aluminum fins of the unit and renders the unit no commercial value.

Example No. 12—Copper Fins

Copper fins will react with ammonia refrigerant and contaminate the refrigerant making the unit and system inoperable and of no commercial value.

Example No. 13—Stainless Steel Fins

Stainless steel fins have too low a thermal conductivity to conduct heat quickly and efficiently and therefore render the system in which they are used of no commercial value.

Example No. 14—Zeolite, Silica or Alumina as Adsorbent

Use of zeolite, silica or alumina as the adsorbent lower the efficiency of the unit and system because of their relatively low surface area compared to activated carbon. These adsorbents are therefore not commercially useful in heat pump system requiring high efficiency.

Example No. 15—Novel Process for Mixing and Pressing as a Thick Tar

After many attempts to produce a stable adsorbent from activated carbon particles adjoined to each other and to the fins and outside diameter of the tube, some of which are described in Examples 1–14, we have discovered and demonstrated a successful novel mixing process for forming a mixture of binder coated activated carbon particles having a solvent-to-activated carbon ratio of about 1.9 and a binder-to-activated carbon ratio of about 0.25 which has the consistency of a thick tar. The thick tar was then pressed into the spaces between consecutive spaced apart fins of a finned tube heat exchanger member, dried further to decrease the solvent-to-carbon ratio to about 1.5 and then pyrolyzed using the temperature-time heating sequence set forth in Example No. 3 above to form a tightly bound activated carbon adsorbent adjoined to the aluminum fins of the finned tube heat exchanger member. Details of this process for producing the integral adsorbent-finned tube heat exchanger member of this invention are set for in Table No. 1.

Analysis has demonstrated that the thusly produced integral adsorbent-heat exchanger units of this invention, when utilized in a heat pump system using ammonia as a refrigerant, enables a system high efficiency to be achieved. Analysis further demonstrates that ammonia-activated carbon heat pump systems using the finned tube heat exchanger member of this invention are very efficient and can compete commercially with standard freon based compressor systems.

FIGS. 7A and 7B are cross-sectional views which illustrate another embodiment of this invention, generally designated by numeral 70, in which the fin part, which comprises a plurality of fins 71, extends in a direction which is both perpendicular to, and longitudinal to, axis 72 of the tube part 73. FIG. 7B is a view through line 7—7 of FIG. 7A. In this embodiment fins 71 extend outwardly from tube part 73. Fins 71 are separate and distinct from each other. As in the embodiment in FIG. 4, an ullage element 42 fills a portion of the hollow central cavity 74. The spaces between fins 71 and outer surface 75 of the tube part are filled with adsorbent 76, which is adjoined to the metal parts of the heat exchanger device thereby forming an integral adsorbent-heat exchanger device. When in use, refrigerant flows to and from the adsorbent through its outside surface 77 thereof, and heat transfer fluid flow into and out of adsorbent-heat exchanger device through ports 78 and 79.

FIGS. 8A and 8B are cross-sectional views which illustrate yet another embodiment of this invention, generally designated by numeral 80, in which the fin part, which comprises a plurality of fins 81 that also extend in a direction which is both perpendicular to, and longitudinal to, axis 82 of the tube part 83. FIG. 8B is a view through line 8—8 of FIG. 8A. As in embodiment 70, fins 81 are separate and distinct from each other. However, in this embodiment the fins extend inwardly from tube part 83. Spaces between fins 81 and the inner surface 85 of the tube part are filled with adsorbent 86 which is adjoined to the metal parts of the heat exchanger device thereby forming an integral adsorbent-heat exchanger device. When in use, refrigerant flow to and from inside cylindrical surface 84 of adsorbent 86 through ports 87 and 88. Heat transfer fluid flow into and out of adsorbent-heat exchanger device 80 through ports 89 and 90 which are in the metal ends 92 of the shell part 94. Metal ends 92 are preferably welded to the shell part 94. Metal ends 96 are preferably welded to the annular part of tube part 83 after placement of adsorbent 86 in the interior of the heat exchanger unit and adjoining or bonding of the adsorbent to the metal tube parts thereof.

While the preferred embodiments of the present invention have been described, it should be understood that various changes, adaptations and modifications may be made thereto without departing from the spirit of the invention and the scope of the appended claims. It should be understood, therefore, that the invention is not to be limited to minor details of the illustrated invention shown in preferred embodiment and the figures and that variations in such minor details will be apparent to one skilled in the art.

Therefore it is to be understood that the present disclosure and embodiments of this invention described herein are for purposes of illustration and example and that modifications and improvements may be made thereto without departing from the spirit of the invention or from the scope of the claims. The claims, therefore, are to be accorded a range of equivalents commensurate in scope with the advances made over the art.

INDUSTRIAL APPLICABILITY

The adsorbent-heat exchanger devices of this invention are useful in heat pump systems used for air conditioning and heating rooms and buildings in the summer and winter, respectively.

TABLE NO. 1

| PROCEDURE | Mixture: First Ratio: Iso./resol | Mixture: Sec'd Ratio: Iso./ACP | Mixture: Third Ratio: Iso./ACP | Resol/ACP |
|---|---|---|---|---|
| A. First Mixture: Add 633 g isopropanol ("iso") to 300 g pure resol and mix. | 2.11 | | | |
| B. Second Mixture: Add 1200 g iso to 1200 g dry activated carbon particles ("ACP"). | | 1.00 | | |
| C. Add second mixture (B) to first mixture (A) and mix thereby forming third mixture. | | | 1.53 | 0.25 |
| D. Add 600 g iso to third mixture (C) to give the consistency of loose tar. | | | 2.02 | 0.25 |
| E. Dry mixture from (D) with a hot air gun to evaporate 150 g of iso from mixture to give | | | 1.90 | 0.25 |

TABLE NO. 1-continued

| | Mixture: | | | |
|---|---|---|---|---|
| | First | Sec'd | Third | |
| | | Ratio: | | |
| PROCEDURE | Iso. / resol | Iso. / ACP | Iso. / ACP | Resol / ACP |
| the consistency of thick tar. | | | | |
| F. Press mixture from (E) in between fins of finned tube heat exchanger member by inserting in a mold pressurizing at a pressure of at least 500 psi pressure. | | | 1.90 | 0.25 |
| G. Drying the finned tube heat exchanger member from (F) at room temperature for 6 days to evaporate 500 g of iso. | | | 1.49 | 0.25 |
| H. Heating the finned tube heat exchanger member from (G) at a rate of 100° C./hr to 600° C. under a dry $N_2$ purge, maintain at 600° C. for 18 hrs. under dry $N_2$ purge thereby pyrolyzing the resol, and then cool to room temperature. | | | 0 | 0 |
| I. Paint a 50/50 iso/resol solution onto outside surface of activated carbon. | | | | |
| J. Re-pyrolyze as in (H). | | | | |
| K. Scrape off any residual paralyzed resol coating on outside surface that has flaked or is loose thereby improving the adsorption characteristic of the activated carbon adjoined to the finned tube heat exchanger member. | | | | |

What is claimed is:

1. An integral apparatus for the transfer of heat comprising:
   a finned tube heat exchanger member having a tube part and a fin part, the fin part being in direct contact with the tube part and outwardly thereof, the fin part forming a plurality of spaced apart fins and spaces along the tube part between the fins; and
   a bonded, pyrolyzed activated carbon adsorbent matrix formed from a mixture comprising activated carbon particles and resol binder, the matrix being in the spaces, adjoined to the fins and the tube part to form an integral apparatus capable of withstanding repetitive adsorption and desorption cycles without the matrix becoming unbonded and without the matrix becoming unadjoined from the fins and the tube part.

2. The integral apparatus of claim 1, wherein the fin part is aluminum.

3. The integral apparatus of claim 1, wherein the tube part is aluminum.

4. The integral apparatus of claim 1, wherein the activated carbon selected from the group consisting of activated carbon particles, activated carbon granules, pre-shaped activated carbon forms, and mixtures thereof.

5. The integral apparatus of claim 1, wherein the tube part is stainless steel.

6. The integral apparatus of claim 4, wherein the fin part of the finned tube heat exchanger member is aluminum and comprises an annular member, which surrounds the tube part, and to which the plurality of spaced apart fins are attached, and wherein the fins extend from the annular member in a direction perpendicular to the axis of the tube part.

7. The integral apparatus of claim 1, wherein the fins extend in a direction perpendicular to the axis of the tube part.

8. The integral apparatus of claim 1, wherein the activated carbon adsorbent comprises pre-shaped activated carbon forms made from activated carbon particles.

9. The integral apparatus of claim 1, wherein the fins extend in a direction perpendicular to, and longitudinal to, the axis of the tube part.

10. An integral apparatus for the transfer of heat comprising:
   a finned tube heat exchanger member having a tube part and a fin part, the fin part being in direct contact with the tube part and outwardly thereof, the fin part forming a plurality of spaced apart fins and spaces along the tube part between the fins; and
   a bonded, pyrolyzed activated carbon adsorbent matrix in the spaces, the adsorbent matrix adjoined to the fins and the tube part by a process which comprises placing a mixture comprising activated carbon particles and resol binder into the spaces, and thereafter, subjecting the apparatus with the mixture in the spaces to an elevated temperature operable for causing the resol binder to bond the activated carbon particles together to form the adsorbent matrix and to adjoin the activated carbon adsorbent matrix to the fins and to the tube part thereby producing an integral apparatus for the transfer of heat, the integral apparatus being capable of withstanding repetitive adsorption and desorption cycles without the activated carbon particles becoming unbonded and without the matrix becoming unadjoined from the fins and the tube part.

11. The integral apparatus of claim 10, wherein the elevated temperature is between about 400° C. and about 600° C.

12. The integral apparatus of claim 10, wherein the elevated temperature is effected by heating the apparatus at a rate of about 100° C./hr under a non-deleterious atmosphere until a peak temperature of about 600° C. is reached, and thereafter, maintaining the apparatus at the peak temperature for about 10 to about 20 hrs.

13. An integral apparatus for the transfer of heat comprising:
- a finned tube heat exchanger member having a tube part and a fin part, the fin part being in direct contact with the tube part and outwardly thereof, the fin part forming a plurality of spaced apart fins and spaces along the tube part between the fins; and
- a bonded, pyrolyzed activated carbon adsorbent matrix in the spaces, the adsorbent matrix adjoined to the fins and the tube part by a process which comprises
  - placing a mixture which comprises a resol binder having a carbon based molecular structure, and particles of activated carbon, into the spaces, and thereafter,
  - subjecting the apparatus with the mixture in the spaces to an elevated temperature operable for pyrolyzing the binder, and for bonding the activated carbon particles to each other to form the adsorbent matrix and to adjoin the adsorbent matrix to the fins, and to the tube part thereby producing an integral apparatus for the transfer of heat, the integral apparatus being capable of withstanding repetitive adsorption and desorption cycles without the activated carbon particles becoming unbonded and without the matrix becoming unadjoined from the fins and the tube part.

14. The integral apparatus of claim 13, wherein the placing of the mixture into the spaces comprises pressing the mixture under an elevated pressure of at least about 690 kPa (100 psi).

15. An integral apparatus for the transfer of heat comprising:
- a finned tube heat exchanger member having a tube part and a fin part, the fin part being in direct contact with the tube part and outwardly thereof, the fin part forming a plurality of spaced apart fins and spaces along the tube part between the fins; and
- a bonded, pyrolyzed activated carbon adsorbent matrix in the spaces, the adsorbent matrix adjoined to the fins and the tube part by a process which comprises
  - pressing a mixture which comprises a resol binder having a carbon based molecular structure, a solvent for the binder, and particles of activated carbon, into the spaces, thereafter,
  - removing an effective amount of the solvent from the mixture operable for allowing the mixture to be pyrolyzed to a density of at least about 0.3 g/cc, and thereafter,
  - subjecting the apparatus with the mixture in the spaces to an elevated temperature operable for pyrolyzing the binder, and for bonding the activated carbon particles to each other to form the adsorbent matrix and to adjoin the adsorbent matrix to the fins, and to the tube part thereby producing an integral apparatus for the transfer of heat, the integral apparatus being capable of withstanding repetitive adsorption and desorption cycles without the activated carbon particles becoming unbonded and without the matrix becoming unadjoined from the fins and the tube part.

16. The integral apparatus of claim 15, wherein the solvent is selected from the group consisting of alcohols, ketones and mixtures thereof.

17. The integral apparatus of claim 15, wherein the solvent is isopropanol.

18. An integral apparatus for the transfer of heat comprising:
- a finned tube heat exchanger member having a tube part and a fin part, the fin part being in direct contact with the tube part and outwardly thereof, the fin part forming a plurality of spaced apart fins and spaces along the tube part between the fins; and
- a bonded, pyrolyzed activated carbon adsorbent matrix in the spaces, the adsorbent matrix adjoined to the fins and the tube part by a process which comprises
  a. forming a first mixture which comprises a resol binder having a carbon based molecular structure and a solvent for the finder,
  b. forming a second mixture which comprises a solvent and particles of activated carbon,
  c. adding an effective amount of the first mixture to the second mixture operable for causing the first mixture to wet the activated carbon particles of the second mixture thereby forming a third mixture,
  d. removing an effective amount of solvent from the third mixture operable for producing a mixture of lower solvent content which can be pressed into the spaces without exuding a large amount of solvent,
  e. pressing the mixture of lower solvent content into the spaces, thereafter and with the mixture pressed into the spaces,
  f. removing an effective amount of solvent from the mixture operable for allowing the mixture to be pyrolyzed to a density of at least about 0.3 g/cc while remaining in the spaces, and thereafter,
  g. subjecting the apparatus with the mixture in the spaces to an elevated temperature operable for pyrolyzing the binder, and for bonding the activated carbon particles to each other to form the adsorbent matrix and to adjoin the adsorbent matrix to the fins, and to the tube part thereby producing an apparatus for the transfer of heat, the integral apparatus being capable of withstranding repetitive adsorption and desorption cycles without the activated carbon particles becoming unbonded and without the matrix becoming unadjoined from the fins and the tube part.

19. The integral apparatus of claim 18, wherein the process for adjoining the adsorbent to the fins and the tube part further comprises, after step (c) and before step (d),
- adding an effective amount of a solvent to the third mixture formed in step (c) to adjust the viscosity of the mixture to between about 10,000 and about 500,000 poise.

20. The integral apparatus of claim 19, wherein the process for adjoining the adsorbent to the fins and the tube part further comprises:
- adjusting the weight ratio of binder-to-activated carbon in step (c) to a value between about 0.05 and about 0.5,
- adjusting the weight ratio of solvent-to-activated carbon in step (c) to a value between about 0.5 and about 6, and adjusting the weight ratio of solvent-to-binder in step (c) to a value between about 6 and about 10.

21. The integral apparatus of claim 18, wherein the process for adjoining the adsorbent to the fins and the tube part further comprises after step (g),
painting a solvent containing dissolved resol on the outside surface of the adsorbent, and thereafter,
subjecting the apparatus to an elevated temperature operable for pyrolyzing the resol on the outside surface.

22. The integral apparatus of claim 18, wherein the process for adjoining the adsorbent to the fins and the tube part further comprises, after step (c) and before step (d),
adding an effective amount of a solvent to the third mixture formed in step (c) to adjust the viscosity of the mixture to between about 10,000 and about 500,000 poise, after step (g),
painting a solvent containing dissolved resol in a solvent on the outside surface of the adsorbent, and thereafter,
subjecting the apparatus to an elevated temperature operable for pyrolyzing the resol on the outside surface.

23. The integral apparatus of claim 18, wherein the process for adjoining the adsorbent to the fins and the tube part further comprises adjusting the weight ratio of solvent-to-binder in step (a) to a value between about 0.5 and about 10.

24. The integral apparatus of claim 18, wherein the process for adjoining the adsorbent to the fins and the tube part further comprises adjusting the weight ratio of solvent-to-activated carbon in step (b) to a value between about 0.1 and about 5.

25. The integral apparatus of claim 18, wherein the process for adjoining the adsorbent to the fins and the tube part further comprises adjusting the weight ratio of binder-to-activated carbon in step (c) to a value between about 0.05 and about 0.5.

26. The integral apparatus of claim 18, wherein the process for adjoining the adsorbent to the fins and the tube part further comprises:
adjusting the solvent-to-binder weight ratio in step (a) to a value between about 1.8 and about 2.4,
adjusting the solvent-to-carbon weight ratio in step (b) to a value between about 0.7 and about 1.3,
adjusting the binder-to-carbon weight ratio in step (c) to a value between about 0.2 and about 0.3,
adding, after step (c) and before step (d), an effective amount of a solvent to the third mixture formed in step (c) to adjust the solvent-to-carbon weight ratio to a value greater than about 1.9 but less than about 2.3, and
adjusting the solvent-to-carbon weight ratio in step (d) to a value at least about 1.7 but less than about 2.

27. The integral apparatus of claim 18, wherein the process for adjoining the adsorbent to the fins and the tube part further comprises:
adjusting the solvent-to-binder weight ratio in step (a) to a value between about 2 and about 2.2,
adjusting the solvent-to-carbon weight ratio in step (b) to a value between about 0.9 and about 1.1,
adjusting the binder-to-carbon weight ratio in step (c) to a value between about 0.22 and about 0.28,
adding, after step (c) and before step (d), an effective amount of a solvent to the third mixture formed in step (c) to adjust the solvent-to-carbon weight ratio to a value greater than about 2 but no greater than about 2.2, and
adjusting the solvent-to-carbon weight ratio in step (d) to a value less than about 1.95.

28. An integral apparatus for the transfer of heat comprising:
a finned tube heat exchanger member having a tube part and a fin part, the fin part being in direct contact with the tube part and inwardly thereof, the fin part forming a plurality of spaced apart fins and spaces along the tube part between the fins; and
a bonded, pyrolyzed activated carbon adsorbent matrix formed from a mixture comprising activated carbon particles and resol binder, the matrix being in the spaces, adjoined to the fins and the tube part to form an integral apparatus capable of withstanding repetitive adsorption and desorption cycles without the matrix becoming unbonded and without the matrix becoming unadjoined from the fins and the tube part.

29. The integral apparatus of claim 28, wherein the fins extend in a direction perpendicular to, and longitudinal to, the axis of the tube part.

* * * * *